(12) United States Patent
Luk et al.

(10) Patent No.: US 6,689,188 B2
(45) Date of Patent: *Feb. 10, 2004

(54) POWDER METALLURGY LUBRICANT COMPOSITIONS AND METHODS FOR USING THE SAME

(75) Inventors: Sydney Luk, Lafayette Hill, PA (US); George Poszmik, Mt. Laurel, NJ (US)

(73) Assignee: Hoeganes Corporation, Cinnaminson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/057,353

(22) Filed: Jan. 25, 2002

(65) Prior Publication Data

US 2003/0161752 A1 Aug. 28, 2003

(51) Int. Cl.$^7$ .................................................. B22F 1/00
(52) U.S. Cl. .......................................... 75/255; 419/36
(58) Field of Search .............................. 75/255; 419/36

(56) References Cited

U.S. PATENT DOCUMENTS

| | | | |
|---|---|---|---|
| 4,483,905 A | 11/1984 | Engstrom | 428/570 |
| 4,834,800 A | 5/1989 | Semel | 106/403 |
| 5,108,493 A | 4/1992 | Causton | 75/255 |
| 5,154,881 A | 10/1992 | Rutz et al. | 419/37 |
| 5,256,185 A | 10/1993 | Semel et al. | 75/255 |
| 5,290,336 A | 3/1994 | Luk | 75/231 |
| 5,298,055 A | 3/1994 | Semel et al. | 75/252 |
| 5,368,630 A | 11/1994 | Luk | 75/252 |
| 5,480,469 A | 1/1996 | Storstrom et al. | 75/228 |
| 5,498,276 A | 3/1996 | Luk | 75/252 |
| 5,518,639 A | 5/1996 | Luk et al. | 252/29 |
| 5,538,684 A * | 7/1996 | Luk et al. | 419/66 |
| 5,624,631 A | 4/1997 | Luk | 419/23 |
| 5,637,132 A * | 6/1997 | Matthews et al. | 75/252 |
| 6,039,784 A | 3/2000 | Luk | 75/231 |
| 6,068,813 A * | 5/2000 | Semel | 419/66 |
| 6,126,715 A * | 10/2000 | Luk | 75/351 |
| 6,187,259 B1 * | 2/2001 | Yamashita et al. | 419/12 |
| 6,224,823 B1 * | 5/2001 | Lindenau et al. | 419/36 |
| 6,346,133 B1 * | 2/2002 | Narasimhan et al. | 75/252 |
| 6,364,927 B1 * | 4/2002 | Narasimhan et al. | 75/252 |

* cited by examiner

*Primary Examiner*—Daniel J. Jenkins
(74) *Attorney, Agent, or Firm*—Woodcock Washburn LLP

(57) ABSTRACT

The present invention relates to improved metallurgical powder compositions that incorporate solid lubricants, methods for preparing and using the same, and methods of making compacted parts. Ejection properties, such as stripping pressure and sliding pressure, of compacted parts can be improved by using the solid lubricants. The solid lubricants contain polyalkylene-polyalkylene oxide block copolymer lubricants or a combination of polyalkylene-polyalkylene oxide block copolymer lubricants and at least one additional lubricant. The polyalkylene-polyalkylene oxide block copolymer lubricants include at least one block A of a linear or branched polyalkylene chain having from about 5 to about 500 carbon atoms, and at least one block B of an alkylene oxide chain having a formula $-[O(CH_2)_r]_m-$, or $-[(CH_2)_rO]_m-$. The polyalkylene block copolymer lubricants can have a formula represented as A-B or A-B-A.

20 Claims, No Drawings

POWDER METALLURGY LUBRICANT COMPOSITIONS AND METHODS FOR USING THE SAME

FIELD OF THE INVENTION

This invention relates to metallurgical powder compositions and methods for using the same. More particularly, the invention relates to metallurgical powder compositions that include an improved lubricant for enhancing green densities and sintered densities while reducing stripping and sliding pressures.

BACKGROUND

The powder metallurgy industry has developed metal-based powder compositions, generally iron-based powders, that can be processed into integral metal parts having different shapes and sizes for uses in various industries, including the automotive and electronics industries. One processing technique for fabricating parts made from metal-based powder composition involves charging a die cavity with metal-based powder composition and compacting the metal-based powder composition under high pressure to form a "green" compact. The green compact is then removed from the die cavity and sintered to form the finished part.

Metallurgical powder compositions are traditionally provided with a lubricant to reduce internal friction between particles during compaction, to permit easier ejection of the compact from the die cavity, to reduce die wear, and/or to allow more uniform compaction of the metallurgical powder composition. The internal friction forces that must be overcome to remove a compacted part from the die are measured as "stripping" and "sliding" pressures. Internal friction forces increase as the pressure of compaction increases.

Lubricants are classified as internal (dry) lubricants or external (spray) lubricants. Internal lubricants are admixed with a metal-based powder prior to adding the metal-based powder composition to the die. External lubricants are sprayed onto the interior walls of the die cavity prior to adding the metal-based powder composition. Common lubricants include metallic stearates or synthetic waxes.

Most known internal lubricants reduce the green strength of the compact. It is believed that during compaction the internal lubricant is exuded between iron and/or alloying metal particles such that it fills the pore volume between the particles and interferes with particle-to-particle bonding. As a result some shapes cannot be pressed using known internal lubricants. Tall, thin-walled bushings, for example, require large amounts of internal lubricant to overcome die wall friction and reduce the required ejection force. Such levels of internal lubricant, however, typically reduce green strength to the point that the resulting compacts crumble upon ejection. Also, internal lubricants such as zinc stearate often adversely affect powder flow rate and apparent density, as well as green density of the compact, particularly at higher compaction pressures. Moreover, excessive amounts of internal lubricants can lead to compacts having poor dimensional integrity, and volatized lubricant can form soot on the heating elements of the sintering furnace. To avoid these problems, it is known to use an external spray lubricant rather than an internal lubricant. However, the use of external lubricants increases the compaction cycle time and leads to less uniform compaction. An example of an external lubricant is set forth in U.S. Pat. No. 5,518,639 issued to Luk, assigned to Hoeganaes Corporation.

Accordingly, there exists a need in the art for metallurgical powder compositions that can be used to fabricate strong green compacts that are easily ejected from die cavities without the need for an external lubricant. Prior solutions to this problem are described in U.S. Pat. Nos. 5,498,276, 5,290,336, 5,154,881, and 5,256,185 issued to Luk, assigned to Hoeganaes Corporation. The U.S. Pat. No. 5,498,276 patent discloses use of a polyether as lubricant for the metallurgical powder composition that provides improved strength and ejection performance of the green compact while maintaining equivalent or superior compressibility relative to the use of other lubricants. The U.S. Pat. No. 5,290,336 patent discloses use of a binder/lubricant comprising a dibasic organic acid and one or more additional polar components that provides enhanced physical properties to the powder composition such as apparent density, flow, compressibility, and green strength. The U.S. Pat. No. 5,154,881 patent discloses use of an amide lubricant that is admixed with iron-based powders that permits compaction of the powder composition at higher temperatures without significant die wear and improves green strength and density.

SUMMARY

The metallurgical powder compositions of the present invention contain metal-based powders and solid lubricants. The solid lubricants contain polyalkylene-polyalkylene oxide (PAO) block copolymer lubricants or a combination of polyalkylene-polyalkylene oxide block copolymer lubricants and at least one additional lubricant.

The polyalkylene-PAO block copolymer lubricants include at least one block A of a linear or branched polyalkylene chain having from about 5 to about 500 carbon atoms, and at least one block B of an alkylene oxide chain having a formula $$-[O(CH_2)_r]_m-,$$

or $$[(CH_2)_rO]_m-$$

where r is from about 1 to about 7, m is from about 1 to about 350, and the copolymer has a weight average molecular weight of less than about 20,000. The polyalkylene-PAO block copolymer lubricants can have a formula represented as A-B, A-B-A, or B-A-B.

The additional lubricants include polyamides, $C_{10}$ to $C_{25}$ fatty acids, metal salts of $C_{10}$ to $C_{25}$ fatty acids, metal salts of polyamides, or combinations thereof. These additional lubricants have a melting range beginning at a temperature of at least about 30 degrees Centigrade.

The solid lubricant contains polyalkylene-PAO block copolymer lubricants, or a mixture of the polyalkylene-PAO block copolymer lubricants and at least one additional lubricant. Preferably, the mixture of lubricants is in the form of discrete particles of each, or the polyalkylene-PAO block copolymer lubricants and the at least one additional lubricant are a melt blend of both forming a homogeneous combination thereof.

The present invention also includes methods for preparing the solid lubricants. The solid lubricants can be prepared by, for example, preparing and then atomizing polyalkylene-PAO block copolymer lubricants, or admixing discrete particles of polyalkylene-PAO block copolymer lubricants and at least one additional lubricant. Alternatively, the solid lubricant can be prepared by blending polyalkylene-PAO block copolymer lubricants and at least one additional lubricant as a melt. The melt is subsequently solidified and atomized.

The present invention also includes methods for preparing metallurgical powder compositions. Metallurgical powder compositions are prepared by admixing the solid lubricant with a metal-based powder.

The present invention also includes methods of making metal parts. Metal parts are prepared by providing a metallurgical powder composition of the present invention, charging the metallurgical powder composition into a die, and compressing the metallurgical powder composition at a pressure of at least about 5 tsi to form a metal part.

DETAILED DESCRIPTION

The present invention relates to improved metallurgical powder compositions, methods for the preparation of those compositions, methods for using those compositions to make compacted parts, methods for making solid lubricants for use in metallurgical powder compositions, and the solid lubricants themselves. Ejection properties, such as stripping pressure and sliding pressure, of compacted parts can be improved by using the solid lubricants.

Metallurgical powder compositions that include solid lubricants are easily removed from a compaction die as shown by reduced stripping and sliding pressures associated with removal of a compacted part from a die. Strip pressure measures the static friction that must be overcome to initiate ejection of a compacted part from a die. Slide pressure is a measure of the kinetic friction that must be overcome to continue the ejection of the part from the die cavity.

Green properties, such as green density, green strength, green expansion, can also be improved by using the solid lubricants. The solid lubricants increase green densities and sintered densities of compacted parts while maintaining equivalent or superior compressibility as compared to conventional lubricants.

The metallurgical powder compositions of the present invention comprise a metal-based powder, preferably an iron-based powder, in admixture with an improved solid lubricant preferably in the form of a particulate powder that contains a polyalkylene-PAO block copolymer lubricant.

The metallurgical powder compositions of the present invention include metal-based powders of the kind generally used in the powder metallurgy industry, such as iron-based powders and nickel-based powders. Examples of "iron-based" powders, as that term is used herein, are powders of substantially pure iron, powders of iron pre-alloyed with other elements (for example, steel-producing elements) that enhance the strength, hardenability, electromagnetic properties, or other desirable properties of the final product, and powders of iron to which such other elements have been diffusion bonded.

Substantially pure iron powders that can be used in the invention are powders of iron containing not more than about 1.0% by weight, preferably no more than about 0.5% by weight, of normal impurities. Examples of such highly compressible, metallurgical-grade iron powders are the ANCORSTEEL 1000 series of pure iron powders, e.g. 1000, 1000B, and 1000C, available from Hoeganaes Corporation, Riverton, N.J. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of from about 2.85–3.00 g/cm$^3$, typically 2.94 g/cm$^3$. Other iron powders that can be used in the invention are typical sponge iron powders, such as Hoeganaes' ANCOR MH-100 powder.

The iron-based powder can optionally incorporate one or more alloying elements that enhance the mechanical or other properties of the final metal part. Such iron-based powders can be powders of iron, preferably substantially pure iron, that has been pre-alloyed with one or more such elements. The pre-alloyed powders can be prepared by making a melt of iron and the desired alloying elements, and then atomizing the melt, whereby the atomized droplets form the powder upon solidification.

Examples of alloying elements that can be pre-alloyed with the iron powder include, but are not limited to, molybdenum, manganese, magnesium, chromium, silicon, copper, nickel, gold, vanadium, columbium (niobium), graphite, phosphorus, aluminum, and combinations thereof. The amount of the alloying element or elements incorporated depends upon the properties desired in the final metal part. Pre-alloyed iron powders that incorporate such alloying elements are available from Hoeganaes Corp. as part of its ANCORSTEEL line of powders.

A further example of iron-based powders are diffusion-bonded iron-based powders which are particles of substantially pure iron that have a layer or coating of one or more other metals, such as steel-producing elements, diffused into their outer surfaces. Such commercially available powders include DISTALOY 4600A diffusion bonded powder from Hoeganaes Corporation, which contains about 1.8% nickel, about 0.55% molybdenum, and about 1.6% copper, and DISTALOY 4800A diffusion bonded powder from Hoeganaes Corporation, which contains about 4.05% nickel, about 0.55% molybdenum, and about 1.6% copper.

A preferred iron-based powder is of iron pre-alloyed with molybdenum (Mo). The powder is produced by atomizing a melt of substantially pure iron containing from about 0.5 to about 2.5 weight percent Mo. An example of such a powder is Hoeganaes' ANCORSTEEL 85HP steel powder, which contains about 0.85 weight percent Mo, less than about 0.4 weight percent, in total, of such other materials as manganese, chromium, silicon, copper, nickel, or aluminum, and less than about 0.02 weight percent carbon. Another example of such a powder is Hoeganaes' ANCORSTEEL 4600V steel powder, which contains about 0.5–0.6 weight percent molybdenum, about 1.5–2.0 weight percent nickel, and about 0.1–0.25 weight percent manganese, and less than about 0.02 weight percent carbon.

Another pre-alloyed iron-based powder that can be used in the invention is disclosed in U.S. Pat. No. 5,108,493, entitled "Steel Powder Admixture Having Distinct Pre-alloyed Powder of Iron Alloys," which is herein incorporated in its entirety. This steel powder composition is an admixture of two different pre-alloyed iron-based powders, one being a pre-alloy of iron with 0.5–2.5 weight percent molybdenum, the other being a pre-alloy of iron with carbon and with at least about 25 weight percent of a transition element component, wherein this component comprises at least one element selected from the group consisting of chromium, manganese, vanadium, and columbium. The admixture is in proportions that provide at least about 0.05 weight percent of the transition element component to the steel powder composition. An example of such a powder is commercially available as Hoeganaes' ANCORSTEEL 41 AB steel powder, which contains about 0.85 weight percent molybdenum, about 1 weight percent nickel, about 0.9 weight percent manganese, about 0.75 weight percent chromium, and about 0.5 weight percent carbon.

Other iron-based powders that are useful in the practice of the invention are ferromagnetic powders. An example is a powder of iron pre-alloyed with small amounts of phosphorus.

The iron-based powders that are useful in the practice of the invention also include stainless steel powders. These stainless steel powders are commercially available in various grades in the Hoeganaes ANCOR® series, such as the ANCOR® 303L, 304L, 316L, 410L, 430L, 434L, and 409Cb powders.

The particles of iron or pre-alloyed iron can have a weight average particle size as small as one micron or below, or up to about 850–1,000 microns, but generally the particles will have a weight average particle size in the range of about 10–500 microns. Preferred are iron or pre-alloyed iron particles having a maximum weight average particle size up to about 350 microns; more preferably the particles will have a weight average particle size in the range of about 25–150 microns, and most preferably 80–150 microns.

The metal-based powders used in the present invention can also include nickel-based powders. Examples of "nickel-based" powders, as that term is used herein, are powders of substantially pure nickel, and powders of nickel pre-alloyed with other elements that enhance the strength, hardenability, electromagnetic properties, or other desirable properties of the final product. The nickel-based powders can be admixed with any of the alloying powders mentioned previously with respect to the iron-based powders including iron. Examples of nickel-based powders include those commercially available as the Hoeganaes ANCORSPRAY® powders such as the N70/30 Cu, N-80/20, and N-20 powders.

The metallurgical powder compositions of the present invention can also include a minor amount of an alloying powder. As used herein, "alloying powders" refers to materials that are capable of alloying with the iron-based or nickel-based materials upon sintering. The alloying powders that can be admixed with metal-based powders of the kind described above are those known in the metallurgical arts to enhance the strength, hardenability, electromagnetic properties, or other desirable properties of the final sintered product. Steel-producing elements are among the best known of these materials. Specific examples of alloying materials include, but are not limited to, elemental molybdenum, manganese, chromium, silicon, copper, nickel, tin, vanadium, columbium (niobium), metallurgical carbon (graphite), phosphorus, aluminum, sulfur, and combinations thereof. Other suitable alloying materials are binary alloys of copper with tin or phosphorus; ferro-alloys of manganese, chromium, boron, phosphorus, or silicon; low-melting ternary and quaternary eutectics of carbon and two or three of iron, vanadium, manganese, chromium, and molybdenum; carbides of tungsten or silicon; silicon nitride; and sulfides of manganese or molybdenum.

The alloying powders are in the form of particles that are generally of finer size than the particles of metal-based powder with which they are admixed. The alloying particles generally have a weight average particle size below about 100 microns, preferably below about 75 microns, more preferably below about 30 microns, and most preferably in the range of about 5–20 microns. The amount of alloying powder present in the composition will depend on the properties desired of the final sintered part. Generally the amount will be minor, up to about 5% by weight of the total powder composition weight, although as much as 10–15% by weight can be present for certain specialized powders. A preferred range suitable for most applications is about 0.25–4.0% by weight.

The metal-based powders generally constitute at least about 80 weight percent, preferably at least about 85 weight percent, and more preferably at least about 90 weight percent of the metallurgical powder composition.

The metal-based powders are blended with solid lubricants of the present invention to form metallurgical powder compositions. The solid lubricants are composed of polyalkylene-PAO block copolymer lubricants or a combination of polyalkylene-PAO block copolymer lubricants and at least one additional lubricant. The metallurgical powder compositions can include the solid lubricants of the present invention, or those solid lubricants combined with traditional internal or external powder metallurgy lubricants. Examples of such traditional lubricants include stearate compounds, such as lithium, zinc, manganese, and calcium stearates commercially available from Witco Corp., and polyolefins commercially available from Shamrock Technologies, Inc.; mixtures of zinc and lithium stearates commercially available from Alcan Powders & Pigments as Ferrolube M, and mixtures of ethylene bis-stearamides with metal stearates such as Witco ZB-90. Other conventional lubricants that can be used as part of the solid lubricant include ACRAWAX (available from Lonza Corporation) and KENOLUBE (available from Höganäs AG of Sweden)

The beneficial improvements in green properties resulting from the use of polyalkylene-PAO block copolymer lubricants are generally proportional to the amount of polyalkylene-PAO block copolymer lubricant relative to any other internal lubricants. Thus, it is preferred that the polyalkylene-PAO block copolymer lubricant generally constitute at least about 10%, preferably at least about 30%, more preferably at least about 50%, and even more preferably at least about 70%, by weight of the solid internal lubricant present in the metallurgical powder composition. In some cases, the polyalkylene-PAO block copolymer lubricant can comprise the entire solid lubricant.

The polyalkylene-PAO block copolymer lubricants include at least one block A of a linear or branched, substituted or unsubstituted polyalkylene chain and at least one block B of a linear or branched, substituted or unsubstituted polyalkylene oxide chain. The block structure of the polyalkylene-PAO block copolymer lubricants can be represented as A-B, A-B-A, or B-A-B. Preferably, ether, ester, or amide bonds connect A blocks and B blocks together.

Preferably, the polyalkylene-PAO block copolymer lubricants have from about 20 to about 700 carbon atoms. The block A polyalkylenes preferably have from about 10 to about 80 carbon atoms. The preferred block A polyalkylenes are polyethylene, polypropylene, polybutylene, polypentylene or combinations thereof. The more preferred block A polyalkylene is polyethylene.

The block B polyalkylene oxides preferably have from about 5 to about 500 carbon atoms having a formula:

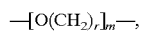

or

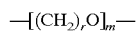

wherein r is from about 1 to about 7, and m is from about 1 to about 400, wherein the block B polyalkylene oxides have weight average molecular weights of less than about 20,000. Preferably, m, is from about 2 to about 200 and r is 2.

Polyalkylene-PAO block copolymer lubricants having an A-B, A-B-A, or B-A-B block structure can be synthesized by conventional methods. Examples of block copolymers having an A-B block structure are the X-1149 resin available from Baker-Petrolite, and the resins available from Aldrich.

It is also contemplated by the present invention that solid lubricants can include a combination of polyalkylene block copolymer lubricants and at least one additional lubricant. The additional lubricants can be either polyamides, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid.

In one embodiment, polyalkylene-PAO block copolymer lubricants having an A-B-A block structure are synthesized by melt blending a polyalkylene-polyalkylene oxide block copolymer and a $C_{10}$ to $C_{25}$ fatty acid at a temperature of about 120 degrees Centigrade to about 200 degrees Centigrade for from about 4 to about 24 hours. This reaction forms an ester bond involving the chain-end hydroxyl functional group of the polyalkylene oxide segment of the polyalkylene-PAO block copolymer and the acid functional group of the fatty acid.

Preferably, polyamides have a melting range that begins at a temperature of at least about 70° C. More preferably, the polyamide is ethylene bis-stearamide that is commercially available as ACRAWAX from Lonza Corporation.

The $C_{10}$ to $C_{25}$ fatty acid is a saturated or unsaturated aliphatic monocarboxylic acid. Preferably, the monocarboxylic acid is a $C_{12-C20}$ saturated acid. The most preferred saturated monocarboxylic acid is stearic acid. The most preferred unsaturated monocarboxylic acid is oleic acid.

The solid lubricant of the present invention generally contains at least about 10 percent by weight, preferably from about 10 to about 90 percent by weight, more preferably from about 10 to about 80 percent by weight, and even more preferably from about 40 to about 80 percent by weight of a polyalkylene-PAO block copolymer lubricant.

When the polyalkylene-PAO block copolymer lubricant is combined with an additional lubricant, the solid lubricants of the present invention generally contain from about 10 to about 90 percent by weight, more preferably from about 20 to about 90 percent by weight, and even more preferably from about 30 to about 70 percent by weight of the at least one additional lubricant. When used in combination, it is preferred that there is used from about 10 to about 90 weight percent of the polyalkylene-PAO block copolymer lubricant and from about 90 to about 10 weight percent of the additional lubricant. More preferably, there is used from about 10 to about 80 weight percent of the polyalkylene-PAO block copolymer lubricant and from about 20 to about 90 weight percent of the stated additional lubricant.

The solid lubricants of the present invention are preferably in the form of discrete particles. The weight average particle size of these particles is preferably between about 2 and 200 microns, more preferably between about 10 and about 150 microns, and even more preferably between about 20 and 110 microns. Preferably about 90% by weight of the polyalkylene-PAO block copolymer lubricant particles are below about 200 microns, preferably below about 175 microns, and more preferably below about 150 microns. Preferably, at least 90% by weight of the polyalkylene-PAO block copolymer lubricant particles are above about 3 microns, preferably above about 5 microns, and more preferably above about 10 microns. Particle size can be measured by conventional laser diffraction methods.

The solid lubricant is blended into the metallurgical powder generally in an amount of from about 0.01 to about 5 weight percent. Preferably, the solid lubricant constitutes about 0.1–5 weight percent, more preferably about 0.25–2 weight percent, and even more preferably about 0.25–0.8 weight percent, of the total weight of the metallurgical powder composition.

A binding agent can optionally be incorporated into the metallurgical powder composition. The binding agent is useful to prevent segregation and/or dusting of the alloying powders or any other special-purpose additives commonly used with iron or steel powders. The binding agent therefore enhances the compositional uniformity and alloying homogeneity of the final sintered metal parts.

The binding agents that can be used in the present method are those commonly employed in the powder metallurgical arts. Examples include those illustrated in U.S. Pat. Nos. 4,483,905 and 4,834,800, which are incorporated herein by reference. Such binders include polyglycols such as polyethylene glycol or polypropylene glycol, glycerine, polyvinyl alcohol, homopolymers or copolymers of vinyl acetate; cellulosic ester or ether resins, methacrylate polymers or copolymers, alkyd resins, polyurethane resins, polyester resins, and combinations thereof. Other examples of binding agents which are applicable are the high molecular weight polyalkylene oxides. The binding agent can be added to the metal-based powder according to the procedures taught by U.S. Pat. Nos. 4,483,905 and 4,834,800, which are herein incorporated by reference in their entirety.

Generally, the binding agent is added in a liquid form and mixed with the powders until good wetting of the powders is attained. Those binding agents that are in liquid form at ambient conditions can be added to the metal-based powder as such, but it is preferred that the binder, whether liquid or solid, be dissolved or dispersed in an organic solvent and added as this liquid solution, thereby providing substantially homogeneous distribution of the binder throughout the mixture.

The amount of binding agent to be added to the metal-based powder depends on such factors as the density and particle size distribution of the alloying powder, and the relative weight of the alloying powder in the composition, as discussed in U.S. Pat. No. 4,834,800 and in co-pending application Ser. No. 848,264 filed Mar. 9, 1992. Generally, the binder will be added to the metal-based powder in an amount of about 0.005–1% by weight, based on the total weight of the metallurgical powder composition.

The present invention also relates to methods of making the solid lubricants. In one preferred embodiment, the solid lubricant includes a combination of discrete dry particles of the polyalkylene-PAO block copolymer lubricants and discrete dry particles of at least one additional lubricant. The solid lubricant is made using convenional wet or dry mixing techniques.

In another preferred embodiment, the polyalkylene-PAO block copolymer lubricants are produced in the final form of particles that are a homogenous combination of polyalkylene-PAO block copolymer lubricant and the at least one additional lubricant. The solid lubricant is made by traditional melt blending techniques. Preferably, during melt preparation of the solid lubricant, at least a portion of the polyalkylene-PAO block copolymer lubricants reacts with the additional lubricant.

The present invention also relates to methods of preparing metallurgical powder compositions. The metallurgical powder compositions are prepared by first admixing a metal-based powder, the solid lubricant of the present invention, and the optional alloying powder, using conventional blending techniques. This admixture is formed by conventional solid particle blending techniques to form a substantially homogeneous particle blend.

The present invention also relates to methods of fabricating metal parts that are compacted in a die according to conventional metallurgical techniques. Metal parts are prepared by providing a metallurgical powder composition in accordance with the present invention, charging the metallurgical powder composition into a die, and compressing the metallurgical powder composition at a pressure of at least about 5 tsi to form a metal part. The compaction pressure is about 5–100 tons per square inch (69–1379 MPa), preferably about 20–100 tsi (276–1379 MPa), and more preferably about 25–70 tsi (345–966 MPa). After compaction, the part is sintered according to conventional metallurgical techniques.

EXAMPLE

The following examples, which are not intended to be limiting, present certain embodiments and advantages of the present invention. Unless otherwise indicated, any percentages are on a weight basis.

In each of the examples, the powders that constitute the metallurgical powder composition were mixed in standard laboratory bottle-mixing equipment for about 20–30 minutes. The metallurgical powder compositions were then compacted into green bars in a die at 50 TSI, followed by sintering in a dissociated ammonia atmosphere for about 30 minutes at temperatures of about 1120° C. (2050° F.).

Physical properties of the metallurgical powders and of the green and sintered bars were determined generally in accordance with the following test methods and formulas:

| Property | Test Method |
| --- | --- |
| Apparent Density (g/cc) | ASTM B212-76 |
| Dimensional change (%) | ASTM B610-76 |
| Flow (sec/50 g) | ASTM B213-77 |
| Green Density (g/cc) | ASTM B331-76 |
| Green Strength (psi) | ASTM B312-76 |
| Hardness ($R_B$) | ASTM E18-84 |
| Sintered Density (g/cc) | ASTM B331-76 |
| Green Expansion: | $G.E. \ (\%) = \dfrac{100[(\text{green bar length}) - (\text{die length})]}{(\text{die length})}$ |

In addition the stripping and sliding pressures were measured for each bar. Stripping pressure measures the static friction that must be overcome to initiate ejection of a compacted part from a die. It was calculated as the quotient of the load needed to start the ejection over the cross-sectional area of the part that is in contact with the die surface, and is reported in units of psi.

Sliding pressure is a measure of the kinetic friction that must be overcome to continue the ejection of the part from the die cavity; it is calculated as the quotient of the average load observed as the part traverses the distance from the point of compaction to the mouth of the die, divided by the surface area of the part that is in contact with the die surface, and is reported in units of psi.

Stripping and sliding pressures were recorded during ejection of compacted green bars as follows. After the compaction step, one of the punches was removed from the die, and pressure was placed on the second punch in order to push the green bar from the die. The load necessary to initiate movement of the green bar was recorded. Once the green bar began to move, it was pushed from the die at a rate of 0.10 cm (0.04 in.) per second. The stripping pressure was the pressure for the removal of the bar at the point where movement was initiated. The sliding pressure was the pressure observed as the part traverses the distance from the point of compaction to the mouth of the die.

Tests were conducted to compare solid lubricants to conventional wax lubricant. Five different metallurgical powder compositions were prepared and compared to a reference powder composition containing a conventional lubricant. The Reference Composition was prepared containing 96.6% wt. Hoeganaes ANCORSTEEL 1000B iron powder, 2.9% wt. $Fe_3P$ ferrophos, and 0.5% wt. conventional lubricant (Kenolube from Höganäs AG of Sweden).

Example 1

The first test composition, Composition A, was the same as the reference powder composition, except that the conventional lubricant was replaced by 0.5% wt. of solid lubricant that included a polyalkylene-PAO block copolymer lubricant and one additional lubricant. The solid lubricant was prepared by melting and mixing together 30% wt. stearic acid with 70% wt. of a polyethylene-polyethylene oxide block copolymer having a number average molecular weight of about 1400 and ethylene oxide content of about 50% wt. (X-1149, Baker-Petrolite) at 175 degrees Centigrade for 6 hours, then atomized and cooled to room temperature.

The powder properties for composition A are shown in Table 1:

TABLE 1

| POWDER PROPERTIES | Reference Composition | Composition A |
| --- | --- | --- |
| Apparent Density | 3.33 | 3.18 |
| Flow | 23.5 | 28.4 |

Test results show that the flowability of Composition A is lower than the flowability of the reference composition. The apparent density of Composition A is lower than the apparent density of the Reference Composition.

The compaction properties of the green bars are shown in Table 2 for a compaction pressure of 50 tons per square inch (tsi):

TABLE 2

| GREEN PROPERTIES | Reference Composition | Composition A |
| --- | --- | --- |
| GREEN DENSITY | 7.23 | 7.31 |
| GREEN STRENGTH | 4412 | 4870 |
| GREEN EXPANSION | 0.13 | 0.14 |
| STRIPPING PRESSURE | 4931 | 3938 |
| SLIDING PRESSURE | 2053 | 2572 |

The stripping pressure was lower for the bars made from Composition A compared to the bars made from the Reference Composition, but the sliding pressure was higher for the bars made from Composition A compared to the bars made from Reference Composition. Further, the green strength of the bars made from Composition A was higher than the green strength of the bars made from the Reference Composition. The green density of the bars made from Composition A was higher than the green density of the bars made from the Reference Composition.

The sintered properties of the green bars compacted at 50 tsi are shown in Table 3:

TABLE 3

| SINTERED PROPERTIES | Reference Composition | Composition A |
| --- | --- | --- |
| SINTERED DENSITY | 7.28 | 7.36 |
| DIMENSIONAL CHANGE | 0.09 | 0.11 |

Test results show that the dimensional change of Composition A was higher than the dimensional change of the Reference Composition. The sintered density of the bars made from Composition A was higher than the sintered density of the bars made from the Reference Composition.

Thus, the incorporation of the polyalkylene-PAO block copolymer lubricant results in metallurgical powder compositions that can be compacted into parts having higher green strengths and green densities that are also easier to remove from the die as shown by the low ejection forces required to remove the green bars from a die.

Example 2

Tests were conducted to determine the effect of a second additional lubricant being melt blended with a solid lubricant. The second test composition, Composition B, was the same as the reference powder composition, except that the conventional lubricant was replaced by 0.5% wt. of a solid lubricant that contained a polyalkylene-PAO block copolymer lubricant and two additional lubricants. The solid lubricant was prepared by melting and mixing together 30% wt. stearic acid with 30% wt. ethylene bis-stearamide and 40% wt. of polyethylene-polyethylene oxide block copolymer having a number average molecular weight of about 920 and an ethylene oxide content of about 50% wt. (from Aldrich) at 175 degrees Centigrade for 6 hours, then atomized and cooled to room temperature.

The powder properties for Composition B are shown in Table 4:

TABLE 4

| POWDER PROPERTIES | Reference Composition | Composition B |
| --- | --- | --- |
| Apparent Density | 3.33 | 3.20 |
| Flow | 23.5 | 26.1 |

The flowability of Composition B is lower than the flowability of the Reference Composition. However, the apparent density of composition B is lower than the apparent density of the reference composition.

The compaction properties of the green bars are shown in Table 5 for a compaction pressure of 50 tsi:

TABLE 5

| GREEN PROPERTIES | Reference Composition | Composition B |
| --- | --- | --- |
| GREEN DENSITY | 7.23 | 7.29 |
| GREEN STRENGTH | 4412 | 3890 |
| GREEN EXPANSION | 0.13 | 0.16 |
| STRIPPING PRESSURE | 4931 | 3255 |
| SLIDING PRESSURE | 2053 | 2667 |

The stripping pressures were lower for the bars made from Composition B compared to the bars made from the Reference Composition, but the sliding pressure was higher for the bars made from Composition B compared to the bars made from the Reference Composition. Further, the green strength of the bars made from Composition B was lower than the green strength of the bars made from the Reference Composition. The green density of the bars made from Composition B was higher than the green density of the bars made from the Reference composition.

The sintered properties of the green bars compacted at 50 tsi are shown in Table 6:

TABLE 6

| SINTERED PROPERTIES | Reference Composition | Composition B |
| --- | --- | --- |
| SINTERED DENSITY | 7.28 | 7.33 |
| DIMENSIONAL CHANGE | 0.09 | 0.07 |

Results show that the dimensional change of Composition B was lower than the dimensional change of the Reference Composition. The sintered density of the bars made from Composition B was higher than the sintered density of the bars made from the Reference Composition.

Thus, the incorporation of a second additional lubricant, ethylene bis-stearamide, resulted in metallurgical powder compositions that can be compacted into parts having higher green densities that are also easier to remove from the die as shown by improved stripping pressure measurements required to remove the green bar from a die.

Example 3

Tests were conducted to determine the effect of a polyalkylene block copolymer lubricant having a low ethylene oxide content when combined with two additional lubricants. The third test composition, Composition C, was the same as the reference powder composition, except that the conventional lubricant was replaced by 0.5% wt. of a solid lubricant that contained a polyalkylene block copolymer lubricant and two additional lubricants. Composition C contained a polyalkylene block copolymer lubricant having a block structure of A-B, a number average molecular weight of about 875 and ethylene oxide content of about 20% wt. (UNITHOX 720, Baker-Petrolite) and two additional lubricants. A melt blend of Lubricant C was prepared by melting and mixing together 30% wt. stearic acid with 30% wt. ethylene bis-stearamide and 40% wt. of the UNITHOX 720 compound at 175 degrees Centigrade for 6 hours, then atomized and cooled to room temperature.

The powder properties for Composition C are shown in Table 7:

TABLE 7

| POWDER PROPERTIES | Reference Composition | Composition C |
| --- | --- | --- |
| Apparent Density | 3.33 | 3.26 |
| Flow | 23.5 | 24.2 |

The flowability of Composition C is lower than the flowability of the reference composition. Composition C had a lower apparent density than the apparent density of the Reference Composition.

The compaction properties of the green bars are shown in Table 8 for a compaction pressure of 50 tsi:

TABLE 8

| GREEN PROPERTIES | Reference Composition | Composition C |
| --- | --- | --- |
| GREEN DENSITY | 7.23 | 7.26 |
| GREEN STRENGTH | 4412 | 4522 |

TABLE 8-continued

| GREEN PROPERTIES | Reference Composition | Composition C |
|---|---|---|
| GREEN EXPANSION | 0.13 | 0.15 |
| STRIPPING PRESSURE | 4931 | 3371 |
| SLIDING PRESSURE | 2053 | 1737 |

The stripping and sliding pressures were lower for the bars made from Composition C compared to the bars made from the Reference Composition. Further, the green strength of the bars made from Composition C was higher than the green strength of the bars made from the Reference Composition. The green density of the bars male from Composition C was also higher than the green density of the bars made from the Reference composition.

TABLE 9

| SINTERED PROPERTIES | Reference Composition | Composition C |
|---|---|---|
| SINTERED DENSITY | 7.28 | 7.33 |
| DIMENSIONAL CHANGE | 0.09 | 0.07 |

Results show that the dimensional change of the bars made from Composition B was lower than the dimensional change of the bars made from the Reference Composition. The sintered density of the bars made from Composition C was higher than the sintered density of the bars made from the Reference Composition.

Thus, incorporating the polyalkylene-PAO block copolymer lubricant results in metallurgical powder compositions that can be compacted into parts having higher green strengths and green densities that are also easier to remove from the die as shown by the lower ejection forces required to remove the green bar from the die. Further, lowering the ethylene oxide content of the metallurgical powder composition gave similar results as metallurgical powder compositions having higher ethylene oxide content.

Example 4

Tests were conducted to determine the effect of polyalkylene-PAO block copolymer lubricants having a high ethylene oxide content when combined with one additional lubricant. The fourth test composition, Composition D, was the same as the reference powder composition, except that the conventional lubricant was replaced by 0.5% wt. of a solid lubricant that contained a polyalkylene-PAO block copolymer lubricant and one additional lubricant. The solid lubricant was prepared by melting and mixing together 70% weight of polyethylene-polyethylene oxide block copolymer lubricant having a block structure of A-B, a number average molecular weight of about 1750 and ethylene oxide content of about 80% wt. (available from Aldrich) with 30% wt. stearic acid at 175 degrees Centigrade for 6 hours, then atomized and cooled to room temperature.

The powder properties for the Composition D are shown in Table 10:

TABLE 10

| POWDER PROPERTIES | Reference Composition | Composition D |
|---|---|---|
| Apparent Density | 3.33 | 3.32 |
| Flow | 23.5 | 21.8 |

The flowability of Composition D is higher than the flowability of the reference composition. The apparent density of Composition D was relatively unchanged compared to the Reference composition.

The compaction properties of the green bars are shown in Table 11 for a compaction pressure of 50 tsi:

TABLE 11

| GREEN PROPERTIES | Reference Composition | Composition D |
|---|---|---|
| GREEN DENSITY | 7.23 | 7.31 |
| GREEN STRENGTH | 4412 | 4505 |
| GREEN EXPANSION | 0.13 | 0.15 |
| STRIPPING PRESSURE | 4931 | 3809 |
| SLIDING PRESSURE | 2053 | 2585 |

Results show that the bars made from Composition D had a lower stripping pressure compared to the bars made from the Reference Composition. Further, the bars made from Composition D had higher green strengths than the bars made from the reference competition. The green density of the bars made from Composition D was also higher than the green density of the bars made from the Reference composition.

The sintered properties of the green bars compacted at 50 tsi are shown in Table 12:

TABLE 12

| SINTERED PROPERTIES | Reference Composition | Composition D |
|---|---|---|
| SINTERED DENSITY | 7.28 | 7.36 |
| DIMENSIONAL CHANGE | 0.09 | 0.08 |

Results show that the dimensional change of the bars made from Composition D was lower than the dimensional change of the bars made from the Reference Composition. The sintered density of the bars made from Composition D was higher than the sintered density of the bars made from the Reference Composition.

Thus, incorporating the polyalkylene-PAO block copolymer lubricant results in metallurgical powder compositions that can be compacted into parts having higher green strengths and green densities that are also easier to remove from the die as shown by lower ejection forces required to remove the green bars from a die.

Example 5

Tests were conducted to determine the effect of different block copolymer structures on the metallurgical powder composition. The fifth test composition, Composition E, was the same as the reference powder composition, except that the conventional lubricant was replaced by 0.5% wt. of a solid lubricant. The solid lubricant contained a polyalkylene block copolymer lubricant having an A-B-A block structure and one additional lubricant. The solid lubricant was prepared by melting and mixing together 16.7% wt. stearic acid with 83.3% wt. of polyethylene-polyethylene oxide block copolymer having a number average molecular weight of about 1400 and an ethylene oxide content of about 50% wt. (X-1149, Baker-Petrolite). The solid lubricant was heated at 175 degrees Centigrade for 8 hours, atomized, and cooled to room temperature. The formation of about 15% wt. to about 20% wt. of an A-B-A type block copolymer was observed by IR spectroscopy.

The powder properties for Composition E are shown in Table 13:

TABLE 13

| POWDER PROPERTIES | Reference Composition | Composition E |
|---|---|---|
| Apparent Density | 3.33 | 3.18 |
| Flow | 23.5 | 26.8 |

E, however, was lower than the apparent density of the Reference Composition. The flowability of Composition E is lower than the flowability of the reference composition. The apparent density of Composition The compaction properties of the green bars are shown in Table 14 for a compaction pressure of 50 tsi:

TABLE 14

| GREEN PROPERTIES | Reference Composition | Composition E |
|---|---|---|
| GREEN DENSITY | 7.23 | 7.30 |
| GREEN STRENGTH | 4412 | 4637 |
| GREEN EXPANSION | 0.13 | 0.14 |
| STRIPPING PRESSURE | 4931 | 4645 |
| SLIDING PRESSURE | 2053 | 2197 |

The stripping pressure were lower for the bars made from Composition E compared to the bars made from the Reference Composition, but the sliding pressure was slightly higher for the bars made from Composition E compared to the bars made from the Reference Composition. Further, the green strength of the bars made from Composition E was higher than the green strength of the bars made from the Reference Composition. The green density of the bars made from Composition E was higher than the green density of the bar made from the Reference composition.

The sintered properties of the green bars compacted at 50 tsi are shown in Table 15:

TABLE 15

| SINTERED PROPERTIES | Reference Composition | Composition E |
|---|---|---|
| SINTERED DENSITY | 7.28 | 7.34 |
| DIMENSIONAL CHANGE | 0.09 | 0.08 |

Results show that the dimensional change of the bars made from Composition E was lower than the dimensional change of the bars made from the Reference Composition. However, the sintered density of the bars made from Composition E was higher than the sintered density of the bars made from the Reference Composition.

Thus, incorporating the polyalkylene-PAO block copolymer lubricant results in metallurgical powder compositions that can be compacted into parts having higher green strengths and green densities that are also easier to remove from the die as shown by lower ejection forces required to remove green bars from a die.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A metallurgical powder composition comprising:
   (a) at least about 80 percent by weight of a metal-based powder; and
   (b) from about 0.01 to about 5 percent by weight, based on the total weight of the metallurgical powder composition, of a solid lubricant, wherein the solid lubricant comprises a polyalkylene-polyalkylene oxide block copolymer lubricant comprising at least one block A of a linear or branched polyalkylene chain having from about 5 to about 500 carbon atoms, and at least one block B of an alkylene oxide chain having a formula:

$-[O(CH_2)_r]_m-$, or $-[(CH_2)_rO]_m-$ wherein r is from about 1 to about 7, and m is from about 1 to about 350, wherein the polyalkylene-polyalkylene oxide block copolymer has a weight average molecular weight of less than about 20,000.

2. The composition of claim 1, wherein the polyalkylene-polyalkylene oxide block copolymer lubricant comprises from about 10 to about 90 percent by weight of the solid lubricant.

3. The composition of claim 1 wherein polyalkylene-polyalkylene oxide block copolymer lubricant is in the form of a powder having a particle size between about 2 and about 200 microns.

4. The composition of claim 3, wherein the solid lubricant further comprises at least 10 percent by weight, based on the total weight of the solid lubricant, of at least one additional lubricant comprising a polyamide, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid.

5. The composition of claim 2 wherein the polyalkylene-polyalkylene oxide block copolymer lubricant comprises a polyalkylene chain having from about 10 to about 100 carbon atoms and in the alkylene oxide chain, m is from about 2 to about 200 and r is 2.

6. The composition of claim 1 wherein the solid lubricant comprises at least 40 weight percent of the polyalkylene-polyalkylene oxide block copolymer lubricant based on the total weight of the solid lubricant.

7. A method of making a metallurgical powder composition comprising:
   (a) providing a solid lubricant, wherein the solid lubricant comprises at least about 10 percent by weight of a polyalkylene-polyalkylene oxide block copolymer lubricant comprising at least one block A of a linear or branched polyalkylene chain having from about 5 to about 500 carbon atoms, and at least one block B of an alkylene oxide chain having a formula $-[O(CH_2)_r]_m-$, or $-[(CH_2)_rO]_m-$ wherein r is from about 1 to about 7, and m is from about 1 to about 350, wherein the copolymer has a weight average molecular weight of less than about 20,000; and
   (b) mixing the solid lubricant with a metal-based powder to form the metallurgical powder composition, wherein the metal-based powder is present in an amount of at least about 80 percent by weight and the solid part lubricant is present in an amount from about 0.01 to about 20 percent by weight, based on the total weight of the metallurgical powder composition.

8. The method of claim 7, wherein the solid lubricant further comprises at least 10 weight percent, based on the total weight of the solid lubricant, of at least one additional lubricant comprising a polyamide, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid.

9. The method of claim 8 wherein the solid lubricant is prepared by the steps comprising mixing the polyalkylene-polyalkylene oxide block copolymer lubricant and the at least one additional lubricant as a melt and solidifying the melt to form the solid lubricant.

10. A method of making a metal part comprising:
(a) providing a metallurgical powder composition comprising a mixture of
  (i) at least about 80 percent by weight of a metal-based powder; and
  (ii) from about 0.01 to about 5 percent by weight, based on the total weight of the metallurgical powder composition, of a solid lubricant, wherein the solid lubricant comprises at least about 10 weight percent of a polyalkylene-polyalkylene oxide block copolymer lubricant comprising at least one block A of a linear or branched polyalkylene chain having from about 5 to about 500 carbon atoms, and at least one block B of an alkylene oxide chain having a formula:

$$-[O(CH_2)_r]_m-,$$

or $$-[(CH_2)_rO]_m-$$

wherein r is from about 1 to about 7, and m is from about 1 to about 350, wherein the copolymer has a weight average molecular weight of less than about 20,000; and
(b) compacting the metallurgical powder composition at a pressure of at least about 5 tsi to form a metal part.

11. The method of claim 10, wherein the solid lubricant further comprises at least 10 percent by weight, based on the total weight of the solid lubricant, of at least one additional lubricant selected from the group consisting of a polyamide, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid.

12. The method of claim 10 wherein the solid lubricant is prepared by the steps comprising mixing the polyalkylene-polyalkylene oxide block copolymer lubricant and the at least one additional lubricant in a molten state and solidifying the molten lubricants to form the solid lubricant.

13. A solid lubricant composition comprising:
(a) at least about 10 percent by weight of a polyalkylene-polyalkylene oxide block copolymer lubricant comprising at least one block A of a linear or branched polyalkylene chain having from about 5 to about 500 carbon atoms, and at least one block B of an alkylene oxide chain having a formula $$-[O(CH_2)_r]_m-,$$

or $$-[(CH_2)_rO]_m-$$

wherein r is from about 1 to about 7, and m is from about 1 to about 350, wherein the copolymer has a weight average molecular weight of less than about 20,000;
(b) at least about 10 percent by weight, based on the total weight of the solid lubricant composition, of at least one additional lubricant comprising a polyamide, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid, wherein the polyalkylene-polyalkylene oxide block copolymer lubricants and the at least one additional lubricant are in intimate admixture to form the solid lubricant.

14. The composition of claim 13 wherein the solid lubricant comprises from about 10 to about 80 percent by weight polyalkylene-polyalkylene oxide block copolymer lubricant and from about 20 to 90 percent by weight of at least one additional lubricant based on the total weight of the solid lubricant.

15. The composition of claim 13 wherein the solid lubricant is in the form of a powder having a weight average particle size of from about 2 to about 200 microns.

16. The composition of claim 14 wherein the polyalkylene-polyalkylene oxide block copolymer lubricant comprises a polyalkylene chain having from about 10 to about 100 carbon atoms and in an alkylene oxide chain, m is from about 2 to about 200 and r is 2.

17. A method for preparing a solid lubricant composition comprising:
(a) blending between about 10 to about 90 percent by weight of a polyalkylene-polyalkylene oxide block copolymer lubricant having the formula, wherein the polyalkylene-polyalkylene oxide block copolymer lubricant at least one block A of a linear or branched polyalkylene chain having from about 5 to about 500 carbon atoms, and at least one block B of an alkylene oxide chain having a formula:

$$-[O(CH_2)_r]_m-,$$

or $$-[(CH_2)_rO]_m-$$

wherein r is from about 1 to about 7, and m is from about 1 to about 350, wherein the copolymer has a weight average molecular weight of less than about 20,000; and
between about 10 and about 90 percent by weight of at least one additional lubricant comprising a polyamide, a $C_5$ to $C_{30}$ fatty acid, a metal salt of a polyamide, or a metal salt of a $C_5$ to $C_{30}$ fatty acid, or ammonium salt of a $C_5$ to $C_{30}$ fatty acid, or a combination thereof, or combinations thereof in their molten state; and
(b) solidifying the melt to form the solid lubricant.

18. The method of claim 17 wherein the solid lubricant is in the form of a powder having a weight average particle size of from about 2 to about 200 microns.

19. The method of claim 17 wherein at least a portion of the polyalkylene-polyalkylene oxide block copolymer lubricant reacts with the at least one additional lubricant during the blending of the solid lubricant to form a tri-block copolymer.

20. The method of claim 19 wherein the polyalkylene-polyalkylene oxide block copolymer lubricant is connected to the at least one additional lubricant by an ester group.

* * * * *